Jan. 4, 1955 L. A. PFULLMAN 2,698,601
CATTLE WORKING GATE
Filed April 25, 1952 2 Sheets-Sheet 1

INVENTOR.
LEROY A. PFULLMAN
BY *Victor J. Evans & Co.*
ATTORNEYS

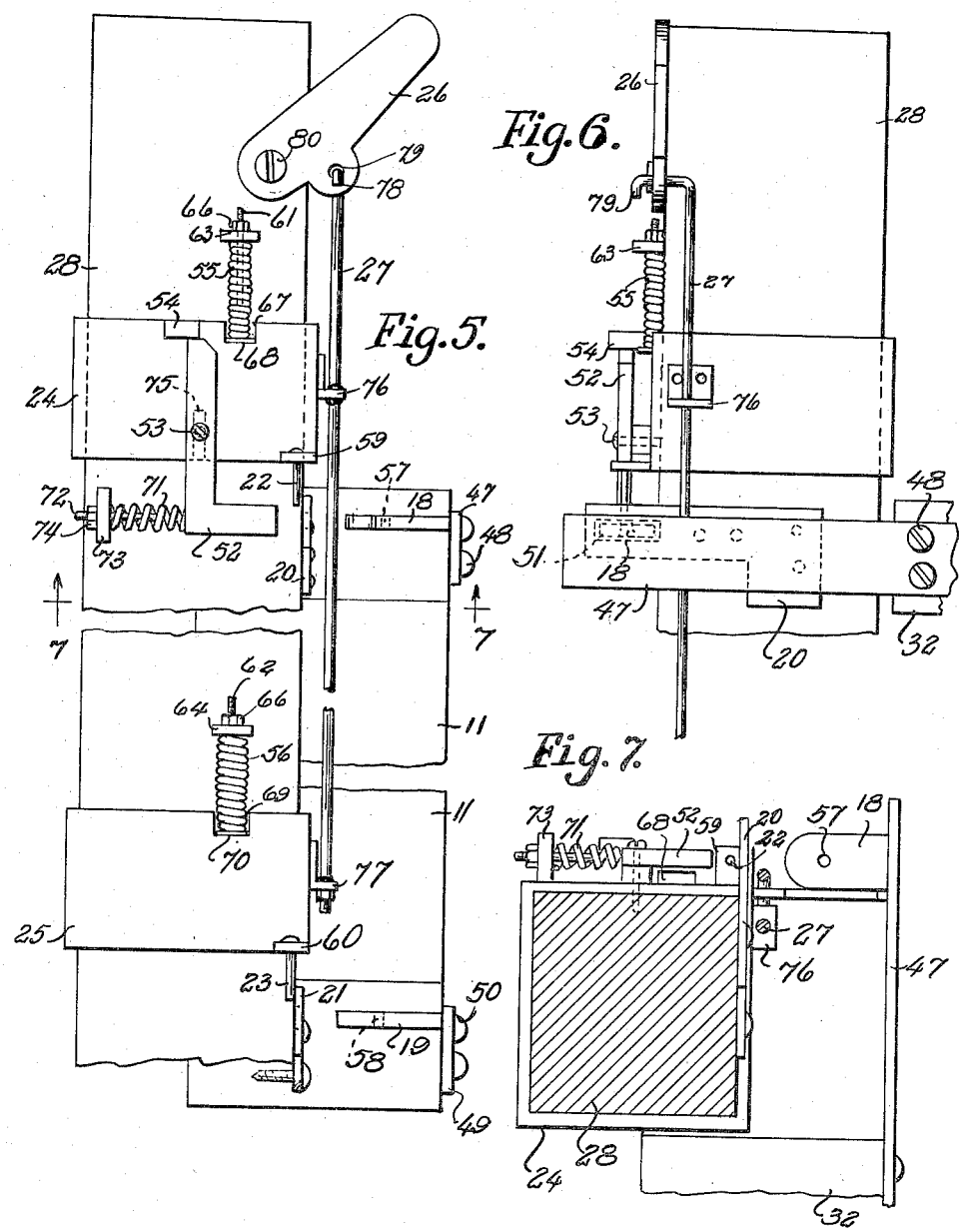

United States Patent Office 2,698,601
Patented Jan. 4, 1955

2,698,601

CATTLE WORKING GATE

Leroy A. Pfullman, Austin, Tex.

Application April 25, 1952, Serial No. 284,220

4 Claims. (Cl. 119—98)

This invention relates to gates of cattle chutes and the like, and in particular a gate having a bent lever providing a yoke thereon wherein with the lever in an open position a cow, steer, or the like will have a tendency to place his head through a section of the gate and with the head in position the bent lever is drawn over and locked with a latch whereby the head of the animal is secured in the yoke.

The purpose of this invention is to provide means for retaining cattle to facilitate dehorning, applying a medicament, such as for pink eye, or for performing other operations on the cattle whereby the cattle are readily secured in position and also in which the cattle are readily released.

Various types of devices have been provided for holding heads of cattle and other animals to facilitate working on the cattle, however, it is difficult to persuade cattle to place their heads in yokes, or in other openings in which the heads may be held. With this throught in mind this invention contemplates a gate for a cattle chute in which a lever pivotally mounted on the upper end of the gate and secured in position with a latch provides a yoke for positively securing the head of a cow, steer, or other animal in the chute whereby the head is positioned to facilitate operating thereon.

The object of this invention is, therefore, to provide an attachment for a gate of a cattle chute whereby stock in the chute are invited to extend their heads through apparently escape openings and wherein means is provided for positively securing the heads in said openings.

Another object of the invention is to provide a cattle chute gate having stock holding means therein that may be incorporated in conventional cattle chutes now in use.

A further object of the invention is to provide an improved gate for cattle chutes in which means is provided for securing heads of cattle in operative position therein in which the gate is of a simple and economical construction.

With these and other objects and advantages in view the invention embodies a comparatively low flat gate having a frame extending upwardly therefrom with means for hinging the gate between posts at the end of a cattle chute, lever actuated latch elements for securing the gate in the closed position, a bent lever pivotally mounted on the gate and positioned to form a yoke above the gate, and a latch for temporarily securing the lever in the position of retaining the head of a cow, steer, or the like in an opening above the slats of the gate.

Other features and advantages of the invention will appear from the following description taken in connection with the drawings, wherein:

Figure 5 is a side elevational view showing the upper part of the post shown at the left hand side of the gate illustrated in Fig. 1, illustrating the latch elements, and showing the parts on an enlarged scale.

Figure 6 is a front elevational view illustrating the parts at the upper end of the latch and with the lower parts of the holding element omitted.

Figure 7 is a cross section looking upwardly taken on line 7—7 of Fig. 5 also illustrating the gate latching elements.

Figure 1:
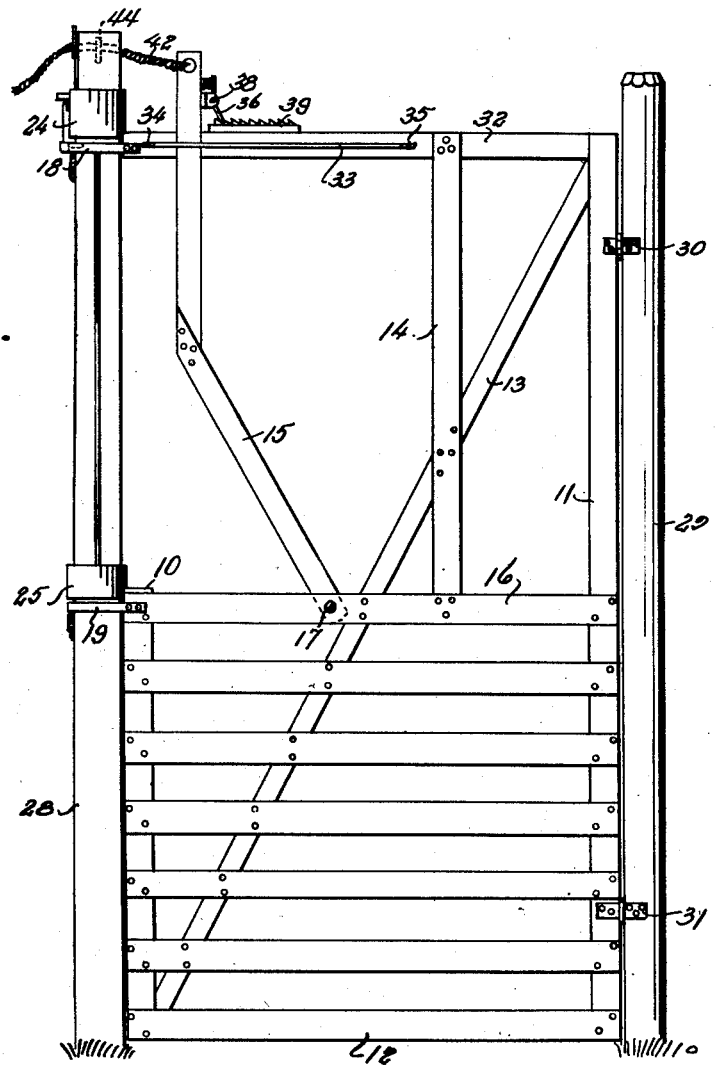
Figure 1 is an end elevational view showing the improved cattle chute gate with the yoke forming lever in the position of retaining the head of an animal between the lever and post at the end of the gate.
Figure 2:
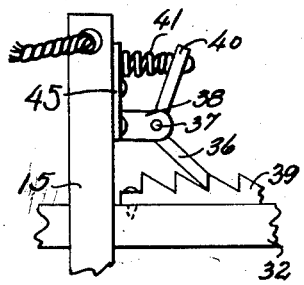
Figure 2 is a detail on an enlarged scale illustrating the latch carried by the upper end of the lever for retaining the lever in the position of holding the head of an animal in the yoke formed thereby.

Referring now to the drawings wherein like reference characters denote corresponding parts the improved cattle chute gate of this invention includes a vertically disposed short rail 10, a parallel vertically positioned end rail 11, transversely disposed slats 12, a diagonal brace 13, a vertically positioned intermediate rail 14, a bent lever 15 pivotally mounted on an upper slat 16 with a bolt 17, and latch elements including tongues 18 and 19 mounted on the gate, positioned to extend through slots in brackets 20 and 21 and adapted to be held by pins 22 and 23, respectively on sliding collars 24 and 25, the collars being actuated vertically with a hand lever 26 which is connected to the collars with a rod 27.

As illustrated in Fig. 1 the gate is positioned between posts 28 and 29 of a cattle chute and the end rail 11 is secured by hinges 30 and 31 to the post 29. The gate is also provided with an upper horizontally disposed bar 32 that is secured to the upper end of the end rail 11 and supported in a horizontal position with the intermediate rail 14. The upper end of the lever 15 extends through an elongated slot formed with a bar 33 that is secured on the side of the bar 32 with offset ends which are held by bolts 34 and 35.

The upper end of the lever 15 is also provided with a latch 36 that is pivotally mounted by a pin 37 in a bracket 38 and the latch is positioned to engage a tooth ratchet bar 39 positioned on the upper surface of the bar 32. The latch 36 is provided with an upwardly extended arm 40 that is resiliently held by a spring 41 to retain the latch 36 in engagement with teeth of the bar 39.

Figure 3:
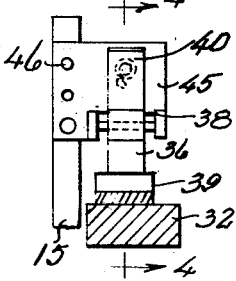
Figure 3 is an end elevational view of the lever holding latch with the parts as shown in Figure 2.
Figure 4:
Figure 4 is a vertical section through the latch, taken on line 4—4 of Figure 3.

The upper end of the lever 15 is provided with a cord or rope 42 that may be secured in a latch 43 on the upper end of the post 28, the rope being provided with a stop 44 as shown in dotted lines in Fig. 1. The bracket 38 and spring 41 are mounted on the extended end of a plate 45 that is secured by bolts 46 to the upper end of the lever 15 as shown in Fig. 3.

The latch elements of the gate are illustrated in Figs. 5, 6, and 7 wherein it will be noted that the tongue 18 extends from the end of a bracket 47 that is secured by screws 48 to the upper bar 32 and the tongue 19 extends from a similar bracket 49 that is secured to the upper slat 16 with screws 50.

The tongue 18 is positioned to extend through a slot 51 in the bracket 20 that is mounted on the post 28 and the tongue 19 is positioned to extend through a similar slot in the bracket 21. With the gate in the closed position the tongues 18 and 19 extend through the brackets 20 and 21 and as the tongues move through the bracket the tongue 18 engages a trip lever 52 pivotally mounted on a pin 53 and positioned to be engaged by a lug 54 on the upper collar 24. With continued movement of the tongue 18 the upper end of the lever 52 moves away from the lug 54 thereby releasing the collars 24 and 25, which are connected by the rod 27 and the collars are urged downwardly by springs 55 and 56 whereby the pins 22 and 23 pass through the slots or openings 57 and 58 in the tongues. The pins 22 and 23 are carried by lugs 59 and 60 which extend from the collars and the springs 55 and 56 are held in position with threaded studs 61 and 62 that are secured in eyes 63 and 64, respectively on the post 28 with lock nuts 65 and 66. The lower end of the spring 55 extends into a notch 67 in the collar 24, the lower end of the spring being held on an extension 68 struck from the collar and the lower end of the spring 56 is positioned in a similar notch 69 wherein the end of the spring is held with an extension 70 struck from the collar 25.

The trip lever 52 is resiliently held by a spring 71 on a stud 72 that is secured in an eye 73 on the post 28 with a lock nut 74.

The pin 53 extends through a slot 75 in the collar 24, as shown in dotted lines in Fig. 5.

The rod 27 is secured, preferably by welding to clip angles 76 and 77 on the collars 24 and 25, respectively, and a hook 78 on the upper end of the rod extends through an opening 79 in the lower part of the lever 26 which is pivotally mounted by a screw 80 on the post 28.

With the parts arranged in this manner the gate is positively locked to the posts at the end of a cattle chute and with the latch 36 released the upper end of the lever 15 is moved over until the upper end engages the upper end of the intermediate rail 14 which provides an opening in one side of the gate above the slat 16 and as an animal extends its head through the opening the lever 15 is drawn over with a rope 42 until the latch 36 engages one of the teeth of the ratchet bar 39 and locks the lever 15 in position. With the head of the animal secured in the gate in this manner the animal may be dehorned, the eyes treated for pink eye, or other work may be performed on the animal without removing the animal from the chute.

When the operation is performed the lever 15 may be released by releasing the latch 36 whereby the head of the animal will be freed and by moving the lever 26 upwardly the pins 22 and 23 release the tongues 18 and 19 whereby the gate may readily be opened.

By this means a gate is provided that may be positioned in the end of a cattle chute, runway or fence and with the gate carried by a hinge or supporting post and positioned to coact with a fastening or latch post a closure is provided that is also adapted to hold an animal for treating the animal.

It will be understood that modifications may be made in the design and arrangement of the parts without departing from the spirit of the invention.

What is claimed is:

1. A cattle working holder comprising a pair of spaced posts, including a hinge post and a latch post, a gate having an opening in the upper part thereof and extended inwardly from one side hinged at the side opposite to that in which the opening is positioned to the hinge, a latch for securing the opposite side of the gate to the latch post, a lever pivotally mounted in the upper part of the gate, said lever positioned to coact with said latch post for securing the neck of an animal in the opening in the upper part of the gate with the body of the animal on one side of the gate and the head on the opposite side, and a latch for retaining the lever in the position of retaining the neck of the animal in said opening.

2. A cattle working holder comprising a pair of spaced posts, including a hinge post and a latch post, a gate having an opening in the upper part thereof and extended inwardly from one side hinged at the side opposite to that in which the opening is positioned to the hinge post, the lower part of said gate including vertically spaced horizontal slats connected at the ends with vertically positioned rails, and the upper part having a vertically disposed intermediate rail spaced from the vertically positioned rail at the hinged end of the gate, a lever pivotally mounted on the upper slat of the gate, said lever positioned to coact with said latch post for securing the neck of an animal in said opening in the upper part of the gate with the body of the animal on one side of the gate and the head on the opposite side, and a latch for retaining the lever in the position of retaining the neck of the animal in said opening.

3. A cattle working holder comprising a pair of spaced posts including a hinge post and a latch post, a gate having an opening in the upper part thereof and extended inwardly from one side hinged at the side opposite to that in which the opening is positioned to the hinge post, latches positioned above and below the opening through the gate for securing the opposite side of the gate to the latch post, a lever pivotally mounted in the upper part of the gate, said lever positioned to coact with said latch post for securing the neck of an animal in said opening in the upper part of the gate with the body of the animal on one side of the gate and the head on the opposite side, and a latch for retaining the lever in the position of retaining the neck of the animal in said opening.

4. A cattle working holder comprising a pair of spaced posts including a hinge post and a latch post, a gate having an opening in the upper part thereof and extended inwardly from one side hinged at the side opposite to that in which the opening is positioned to the hinge post, the lower part of said gate including vertically spaced horizontal slats connected at the ends with vertically positioned rails, and the upper part having a vertically disposed intermediate rail spaced from the vertically positioned rail at the hinged end of the gate, a lever having a vertically disposed upper section and a diagonally disposed lower section pivotally mounted on the upper slat of the gate, said lever positioned to coact with said latch post for securing the neck of an animal in said opening in the upper part of the gate with the body of the animal on one side of the gate and the head on the opposite side, a horizontally disposed bar extended from the upper end of the vertically disposed rail on the side of the gate hinged to the post, over the gate, and to which the upper end of the intermediate rail is connected, and a latch on said bar for retaining the lever in the position of retaining the neck of the animal in said opening.

References Cited in the file of this patent

UNITED STATES PATENTS

| 2,554,558 | Bush | May 29, 1951 |
| 2,571,487 | Rolfe et al. | Oct. 16, 1951 |
| 2,587,318 | Hively | Feb. 26, 1952 |

FOREIGN PATENTS

| 610,467 | Great Britain | Oct. 15, 1948 |